(12) United States Patent
Grossman

(10) Patent No.: US 7,902,271 B2
(45) Date of Patent: *Mar. 8, 2011

(54) COMPOSTABLE VINYL HALIDE POLYMER COMPOSITIONS, COMPOSITES AND LANDFILL BIODEGRADATION

(75) Inventor: Richard F. Grossman, Wilmington, DE (US)

(73) Assignee: Biotech Products, LLC, Randolph, NJ (US)

( * ) Notice: Subject to any disclaimer, the term of this patent is extended or adjusted under 35 U.S.C. 154(b) by 863 days.

This patent is subject to a terminal disclaimer.

(21) Appl. No.: 11/747,481

(22) Filed: May 11, 2007

(65) Prior Publication Data

US 2007/0208105 A1 Sep. 6, 2007

Related U.S. Application Data

(63) Continuation-in-part of application No. 11/041,322, filed on Jan. 24, 2005, now Pat. No. 7,390,841.

(51) Int. Cl.
*A61L 2/08* (2006.01)
*B09B 5/00* (2006.01)
*B32B 3/10* (2006.01)
*B32B 5/00* (2006.01)
*B32B 7/00* (2006.01)
*B32B 9/04* (2006.01)
*B32B 27/02* (2006.01)
*C07F 7/00* (2006.01)
*C08F 8/00* (2006.01)
*C08F 14/06* (2006.01)
*C08F 32/00* (2006.01)
*C08F 132/00* (2006.01)
*C08F 214/06* (2006.01)
*C08F 114/06* (2006.01)
*C08G 18/28* (2006.01)
*C08G 63/48* (2006.01)
*C08J 3/00* (2006.01)
*C08L 27/00* (2006.01)
*D06N 7/00* (2006.01)
*D06N 7/04* (2006.01)
*D06P 1/52* (2006.01)
*B60K 15/04* (2006.01)
*B44D 3/18* (2006.01)
*C08C 19/00* (2006.01)

(52) U.S. Cl. ...... 523/124; 405/129.95; 428/98; 428/137; 428/147; 428/190; 442/155; 442/164; 523/126; 524/176; 524/178; 524/210; 524/218; 524/225; 524/567; 524/568; 524/569; 525/55; 525/326.1; 525/326.2; 525/330.7; 525/331.4; 525/331.5; 525/370

(58) Field of Classification Search ............ 428/98, 428/137, 147, 190; 442/155, 164; 523/124, 523/126; 524/176, 178, 210, 218, 225, 567, 524/569, 568; 405/129.95; 525/55, 326.1, 326.2, 330.7, 331.4, 331.5, 370
See application file for complete search history.

(56) References Cited

U.S. PATENT DOCUMENTS

| | | | |
|---|---|---|---|
| 2,641,588 A | 8/1953 | Leistner et al. |
| 2,641,596 A | 8/1953 | Leistner et al. |
| 2,648,650 A | 8/1953 | Weinberg et al. |
| 2,726,227 A | 12/1955 | Leistner et al. |
| 2,726,254 A | 12/1955 | Leistner et al. |
| 2,801,258 A | 7/1957 | Johnson |
| 2,870,119 A | 1/1959 | Leistner et al. |
| 2,870,182 A | 1/1959 | Leistner et al. |
| 2,872,468 A | 2/1959 | Leistner et al. |
| 2,883,363 A | 4/1959 | Leistner et al. |
| 2,891,922 A | 6/1959 | Johnson |
| 2,914,506 A | 11/1959 | Mack et al. |
| 2,954,363 A | 9/1960 | Kuehne et al. |
| 3,021,302 A | 2/1962 | Frey et al. |
| 3,413,264 A | 11/1968 | Hechenbleikner et al. |
| 3,424,712 A | 1/1969 | Gottlieb et al. |
| 3,424,717 A | 1/1969 | Gottlieb et al. |
| 4,069,192 A | 1/1978 | Monte et al. |
| 4,080,353 A | 3/1978 | Monte et al. |
| 4,087,402 A | 5/1978 | Monte et al. |
| 4,094,853 A | 6/1978 | Monte et al. |
| 4,096,110 A | 6/1978 | Monte et al. |
| 4,098,758 A | 7/1978 | Monte et al. |
| 4,101,810 A | 7/1978 | Schermerhorn et al. |
| 4,122,062 A | 10/1978 | Monte |
| 4,152,311 A | 5/1979 | Monte et al. |
| 4,192,792 A | 3/1980 | Sugerman et al. |
| 4,261,913 A | 4/1981 | Monte et al. |
| 4,277,415 A | 7/1981 | Sugerman et al. |

(Continued)

FOREIGN PATENT DOCUMENTS

GB  A-1 423 657  2/1976

(Continued)

OTHER PUBLICATIONS

A.V. Yabannavar et al., Methods for Assessment of Biodegradability of Plastic Films in Soil, Applied and Environmental Microbiology, vol. 60, No. 10, Oct. 1994, p. 3608-3614.
T.M. Phillips et al., Biodegradation of Hexachlorocyclohexane (HCH) by Microorganisms, Biodegradation 16:363-392 (2005).
Y. Otake et al., Biodegradtion of Low-Density Polyethylene, Polystyrene, Polyvinyl Chloride, and Urea Formaldehyde Resin Buried Under Soil for Over 32 Years, J Applied Polymer Science, vol. 56, 1789-1796 (1995).
I. Mersiowsky, Fate of PVC Polymer, Plasticizers, and Stabilizers in Lanfilled Waste, J Vinyl & Additive Technology, vol. 8, No. 1, Mar. 2002.
Leonard I. Nass and Charles A. Heiberger, Encyclopedia of PVC, vol. 2, p. 47, Marcel Dekker, Inc., New York.

(Continued)

*Primary Examiner* — Patrick D Niland
(74) *Attorney, Agent, or Firm* — Wood, Herron & Evans LLP.

(57) ABSTRACT

Compositions of vinyl halide polymers such as PVC are rendered compostable by a prodegradant system of a monomeric adduct of an organotitanate or zirconate and an organotin. PVC sheets and composites are compostable in landfills.

24 Claims, No Drawings

U.S. PATENT DOCUMENTS

| | | | |
|---|---|---|---|
| 4,338,220 A | 7/1982 | Sugerman et al. | |
| 4,417,009 A | 11/1983 | Sugerman et al. | |
| 5,514,734 A | 5/1996 | Maxfield et al. | |
| 7,390,841 B2 * | 6/2008 | Grossman | 523/124 |
| 2008/0166789 A1 | 7/2008 | Grossman | |
| 2009/0253324 A1 | 10/2009 | Grossman | |
| 2009/0275111 A1 | 11/2009 | Grossman | |

FOREIGN PATENT DOCUMENTS

| | | |
|---|---|---|
| GB | A-1 488 620 | 10/1977 |

OTHER PUBLICATIONS

Ha, K R et al., "Polycarpolactone Polyvinyl Chloride Polyvinyl Chloride Mixture Biodegradable Film Sheet", Abstract Only, Database WPI Section Ch. Week 200348 Derwent Publications Ltd, London, GB; AN2003-511077 XP002353301 and KR 2003 019 726 A (HA K R) Mar. 7, 2003.

Product Data Sheet for Ken-React(R) KR(R) 238J—Titanate Coupling Agent; Kenrich Petrochemicals, Inc., Oct. 4, 2006.

* cited by examiner

COMPOSTABLE VINYL HALIDE POLYMER COMPOSITIONS, COMPOSITES AND LANDFILL BIODEGRADATION

RELATED APPLICATION

This application is a continuation-in-part application of U.S. patent application Ser. No. 11/041,322, filed Jan. 24, 2005, entitled "Compostable Vinyl Halide Polymer Compositions and Composite Sheets", and the entire description and claims of that application are incorporated herein by reference.

FIELD OF THE INVENTION

This invention relates to compostable or biodegradable vinyl halide polymer compositions, for example, polyvinyl chloride (PVC) and composite sheets of such polymers.

BACKGROUND OF THE INVENTION

For many years it has been desired to make plastic materials from vinyl halide polymers such as polyvinyl chloride (PVC), which are either biodegradable by microorganisms or environmentally degradable such as in a landfill. In spite of considerable efforts, landfills are becoming inundated with plastic materials, and articles made therefrom, that will not degrade perhaps for centuries. This is especially true for vinyl halide polymer materials such as PVC that are considered non-biodegradable, that is, they persist in landfills under anaerobic conditions indefinitely without noticeable decomposition. This factor limits the acceptance of PVC in many products where its useful balance of properties and low cost would be attractive. An example is that of printable film and sheet. If a sample of flexible (plasticized) PVC is tested per ASTM D 5526, Standard Test Method for Determining Anaerobic Biodegradation of Plastic Materials Under Accelerated Landfill Conditions, there is no appreciable weight loss or change in appearance after 100 days at 97° F. in contact with simulated household waste. In contrast, cellulosic polymers and other biodegradable plastics, such as polylacetic acid and polycaprolactone, are completely consumed.

There has been a particular need for a compostable vinyl halide polymer composition for use in many end products such as polyvinyl chloride films, banners, billboards, signs, laminates, ink jet media, diapers, hygienic pads and the like. These products must satisfy properties for practical purposes such as tear strength, tensile and impact strengths to function in many useful articles. However, the same properties that make them useful lead to their lack of biodegradability. PVC and other vinyl halide polymers have achieved widespread usage in many practical articles. However, the goal of a compostable vinyl halide polymer composition or composite has not been satisfied.

SUMMARY OF THE INVENTION

This invention is directed to a compostable vinyl halide polymer composition. In particular, polyvinyl chloride (PVC) compositions have been rendered compostable by formulation with a prodegradant composition of an organotitanate or zirconate compound and an organotin compound.

As reported in the above-identified Ser. No. 11/041,322 patent application, in a broader form of the invention, polyvinyl chloride compositions have been formulated with plasticizer and stabilizer along with the prodegradant composition. Polymeric sheets containing this composition and composites with woven or nonwoven sheets have been made compostable.

As was also reported in the above-identified Ser. No. 11/041,322 patent application, it has now been found that PVC can be formulated to yield biodegradability comparable or superior to cellulosic polymers. In a more specific form of the invention, such compositions consist of (a) PVC; (b) a plasticizer selected from the group of completely aliphatic carboxylic acid esters; (c) a heat stabilizer selected from the group of sulfur-free dialkyl and monoalkyltin carboxylates; and (d) a reactive organotitanate or organozirconate. Such compositions can be used to produce PVC film and sheet by standard methods, such as extrusion, calendering or coating from plastisols or organosols. They may contain other additives routinely used in PVC compounding, such as fillers, pigments, antioxidants, UV light absorbers, bonding agents, etc. Such films may be laminated to biodegradable fabrics, made from polymers such as polyvinyl alcohol, polyamide, polylacetic acid, polyacrylamide, polyacrylate, polymethacrylate and polyester, or to paper to produce laminates that are totally biodegradable under landfill conditions. These laminates are particularly useful for printable sheeting constructions that, after usage, may be disposed of in standard landfills.

Further unobvious or unexpected improvements have been made in the invention. In particular, compositions of vinyl halide resins such as PVC, even without plasticizer, are compostable when the prodegradant system of this invention is employed. In addition, it has also been found that the reactive organotitanate or organozirconate can be broadened to include other monomeric adducts in addition to the amide adduct disclosed in the above-identified application. For instance, an ester adduct of the organotitanate or organozirconate and an organotin compound, in relative amounts, has been found to render the vinyl halide polymer composition compostable, even in the absence of a plasticizer.

Accordingly, this application is directed to compostable vinyl halide polymer compositions comprising a vinyl halide polymer and a prodegradant system comprising a monomeric adduct of an organotitanate, or organozirconate, and an organotin compound, wherein the prodegradant system is employed in relative amounts to render the vinyl halide polymer composition compostable. As employed herein, the term "adduct" is intended to mean a complex association of the monomeric molecule and the organotitanate or organozirconate molecule. It was previously reported that amide salts of the neoalkoxy modified monoalcoxy titanate or zirconate achieved the objectives of the invention. The amide salts were defined particularly by methacrylamide as the monomeric adduct of the reactive titanate or zirconate. It has also been found that the ester adducts of the specific organotitanates or zirconates can also function in the prodegradant system of this invention. The monomeric ester of the organotitanate or organozirconate adduct is exemplified by dimethylaminoethyl methacrylate. It has also been found that the dimethylaminopropyl acrylamide is found to be as effective as the methacrylamide.

The compositions and composites of this invention, as well as useful articles made therefrom, are compostable. "Compostable" means that the composition or sheet undergoes chemical, physical, thermal and/or biological degradation such that it may be incorporated into and is physically indistinguishable from finished compost (humus) and which ultimately mineralizes (biodegrades) to $CO_2$, water and biomass in the environment like other known compostable matter such as paper and yard waste. The compostable films and composites are either biodegradable or environmentally degradable. "Biodegradable" means that the composition or composite is susceptible to being assimilated by microorganisms when buried in the ground or otherwise contacted with the organisms under conditions conducive to their growth. "Environmentally degradable" means that the film or layer is capable of being degraded by heat or surrounding environmental elements without microorganisms to a form that ultimately may be biodegradable when it mineralizes, for example, biodegrades to carbon dioxide, water and biomass. For purposes of this invention, "compostable" is intended to include "biodegradable" or "environmentally degradable".

Composting conditions that enable the chemical, physical, thermal and/or biological degradation of the composition or composite may vary. The compositions or composites of this invention are especially adapted to be compostable in municipal solid waste composting facilities or landfills. For example, following ASTM D 5526-94 (reapproved 2002), Standard Test Method for Determining Anaerobic Biodegradation of Plastic Materials Under Accelerated Landfill Conditions, samples of PVC were degraded, incorporated into and physically indistinguishable in the test landfill.

Compostable vinyl halide polymer compositions and composites of this invention, their method of manufacture and compostability will be understood with reference to the following detailed description.

DETAILED DESCRIPTION OF THE INVENTION

A. Vinyl Halide Polymer

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing polymers or resins which are employed and which illustrate the principles of this invention include chlorinated polyethylene, chlorosulfonated polyethylene, chlorinated polyvinyl chloride, and other vinyl halide polymer or resin types. Vinyl halide polymer or resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl—)n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Prodegradant System

The prodegradant system or composition of this invention comprises a monomeric adduct of an organozirconate or organotitanate and an organotin compound. The monomeric adducts are exemplified by the monomeric groups of dimethylaminopropyl acrylamide, methacrylamide, dimethylaminoethyl methacrylate, and other similar reactive monomeric groups as detailed herein. In a broader sense, the adducts more preferably comprise dialkylamino-short alkyl-chain-reactive monomers. The prodegradant system may be defined more particularly as follows:

(1) Organotitanate or Organozirconate Monomeric Adducts

The chemical description and chemical structure of organotitanates or zirconates has been well developed. For instance, Kenrich LICA 38J is a reactive titanate under the chemical name titanium IV neoalkanolato, tri(dioctyl)pyrophosphate-O (adduct) N-substituted methacrylamide. Furthermore, with zirconium substituted for titanium, Kenrich produces NZ 38 under the chemical description zirconium IV neoalkanolato, tri(dioctyl)pyrophosphate-O (adduct) N-substituted methacrylamide. These compounds are generally referred to as amide salts of neoalkoxy modified monoalkoxy titanate or zirconate. While the invention has been exemplified with these amide adducts of these specific organotitanates or organozirconates, it is to be understood that other similar compounds can achieve the objectives of this invention.

The K38J pyrophosphato titanium adduct is the reaction product of K38+ dimethylaminopropyl methacrylamide (DMPDMA), according to the following structure where R'=methyl, R"=propyl, R=butyl, n~3.

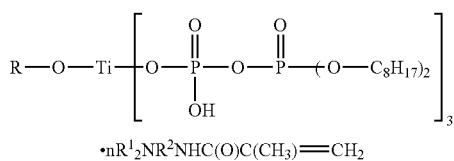

K38=the above structure without DMPDMA. These two ingredients react rapidly at room temperature when mixed in stoichiometric proportions (close to 3:1). P—OH becomes P—O$^-$ and R$_2$N, R$_3$N+. A bright red color develops, which is the thermochromic, indicating coordination of likely C=O to titanium, which displays such colors when penta-coordinate instead of tetra-coordinate. (For example, acetone.TiCl$_4$ is orange-red, and the precursors, colorless.) Neither K38 nor DMPDMA cause depolymerization of halogenated polymers when used alone. However, if added separately to the PCV compound, the combination in situ is as effective as K38J. Thus, use of the term "adduct" is intended to cover the use of preformed complex or the separate addition of the components to enable their association or complexing in situ to provide the prodegradant effects of this invention.

A substituted methacrylamide can also be employed as an adduct of the organotitanate or zirconate. For instance, Kenrich Ken-React KR-238J is another reactive titanate where the monomeric adduct is a substituted methacrylamide. The KR-238J is a dimethylaminopropyl acrylamide which has been found to be as effective as the methacrylamide adduct of Kenrich-38J, described above. A chemical description of KR-238J is di(dioctyl)pyrophosphato ethylene titanate (adduct) N-substituted methacrylamide. Furthermore, dimethylaminoethyl methacrylate, a monomeric ester adduct, is equally effective in combination with the pyrophosphato form of the titanium or zirconium coupling agent. The K238J adduct has the chemical structure as follows:

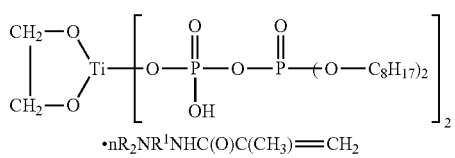

·nR$_2$NR$^1$NHC(O)C(CH$_3$)=CH$_2$

K238=the above structure without DMPDMA. Thus, as used herein "K38 and "K238" are intended to mean the organopyrophosphato titanate portion of the adduct which is complexed with the monomeric amide, ester, or other like monomers. Specific compounds are exemplified by titanium IV neoalkanolato tri(dioctyl)pyrophosphato-O (adduct) N-substituted methacryloamide and zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide propenoamide, and zirconium IV bis(dioctyl)pyrophosphato-O (adduct) N,N-dimethylamino-alkyl propenoamide.

The above monomeric adducts result from salt formation via the titanate/zirconate acidic —P=O(OH) group. The monomer contains a basic functional group that will react to form a salt (but not go on to other reactions such as oxidation). A tertiary amine group is favorable. This could be a dialkyl amine group, methylpyridine functionality or a range of basic nitrogen heterocyclic groups. The rest of the reactive momomer must contain an activated carbon-carbon double bond. The C=C bond, to be activated, should be conjugated with C=O, as in an ester, ketone, aldehyde or amide, with —CN, with oxygen as in a vinyl ether, or with oxygen, nitrogen or sulfur in an allylic linkage, or with an aromatic ring as in styrene or vinyl ferrocene.

In a more generalized form, the adducts can be defined as:

organotitanate or zirconate —P=O(OH) salt-forming group-R—C=C-activating group, where R is a hydrocarbon radical or substituted hydrocarbon radical and the activating group is conjugated with the C=C.

Other monomers of the adducts of this invention are exemplified by the following:

ethyl dimethylaminoethylmethacrylate (CH$_3$)$_2$N—CH$_2$—CH$_2$—CH=C—C=O
                              |    \
                              CH$_3$  O—CH$_2$CH$_3$ methyl dimethylaminopropyl acrylate (CH$_3$)$_2$N—CH$_2$—CH$_2$—CH$_2$—CH=CH—C=O
                                        \
                                         OCH$_3$ 2-morpholine-N-ethyl acrylamide

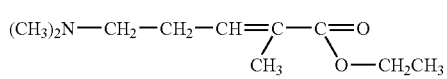

2-piperidinyl-N-ethyl acrylonitrile

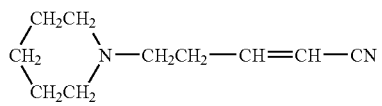

2-dimethylaminoethyl acrolein (CH$_3$)$_2$N—CH$_2$CH$_2$—CH=CH—CH=O dimethylaminoethyl vinyl ether (CH$_3$)$_2$N—CH$_2$CH$_2$—O—CH=CH$_2$ dimethylaminoethyl vinyl thioether
4-dimethylaminomethyl styrene (CH$_3$)$_2$N—CH$_2$-ARYL-CH=CH$_2$ allyl 3-dimethylamino propionate

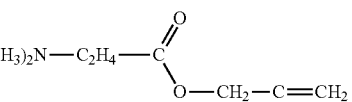

methallyl 3-dimethylamino propionate

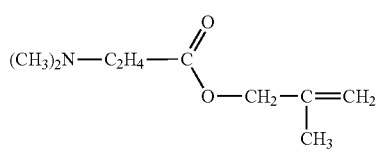

thioallyl 3-dimethylamino propionate

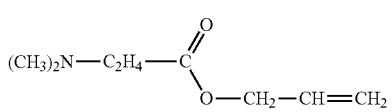

dimethylaminomethyl acrylate (reverse ester), also corresponding reverse amides

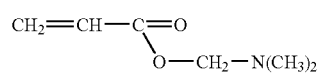

dimethylaminomethylacrylamide

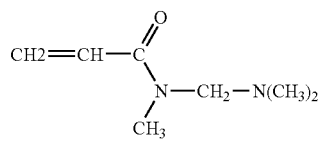

These organotitanates or zirconates are further described in considerable detail in the following U.S. patents which are incorporated herein in their entireties by reference, namely, U.S. Pat. Nos. 4,069,192; 4,080,353; 4,087,402; 4,094,853; 4,096,110; 4,098,758; 4,122,062; 4,152,311; 4,192,792; 4,101,810; 4,261,913; 4,277,415; 4,338,220; 4,417,009.

(2) Organotin Compounds

Mono- and diorganotin compounds are well known stabilizers for PVC. The generalized organotin stabilizer formula is $R_2SnX_2$ or $R_2SnX_3$. The R-group used in the above general formula of tin stabilizers can be lower alkyl such as butyl. More recently, because of availability and relatively low cost, fatty acid carboxylates have been employed. Cost-effective methods have been developed to produce tin intermediates, which were then reacted with carboxylic acids or with ligands containing mercaptan groups to yield stabilizers for vinyl halide resins. Accordingly, among the class of organotin compounds suitable for use in accordance with this invention are organotin carboxylates or organotin sulfur-containing compounds are U.S. Pat. Nos. 2,641,588; 2,648,650, 2,726,227; 2,726,254; 2,801,258; 2,870,119; 2,891,922; 2,914,506 and 2,954,363; the organotin mercaptoacid esters as described in U.S. Pat. No. 2,641,596; organotin esters of mercapto alcohols of U.S. Pat. Nos. 2,870,119; 2,870,182; 2,872,468 and 2,883,363; and organo thiostannoic acids such as butyl thiostannoic acid as disclosed in U.S. Pat. Nos. 3,021,302; 3,413,264; 3,424,712 and 3,424,717. All of these patents are incorporated herein in their entireties by reference. Organotin carboxylates, such as dibutyltin dilaurate or dibutyltin maleate, are preferred. Other organotins can be used.

(3) Prodegradant Synergistic Composition

It has been discovered that the prodegradant composition of organotitanate or organozirconate adduct, i.e., the organopyrophosphato monomeric adduct, compound and organotin displays an unpredicted synergism in the compostability of vinyl halide polymers. The remarkable compostability property exists over ranges of ratios of the essential components. The exact mechanism for the unexpected results and the compostability of vinyl halide polymers with the prodegradant system is not completely understood. Certainly there are theories which could be proposed, but regardless of theories, the beneficial results evident in the numerous examples of this invention which follow, in further view of this detailed description, speak for themselves. Applicant relies upon these empirical demonstrations of the principles of this invention to advance its merit.

In the prodegradant system of this invention, it has been found that the total composition of prodegradant is useful over a range of about 1 to about 10 parts (phr) by weight based upon 100 parts by weight of the vinyl halide polymer. The most useful range of total parts by weight of the organotin or zirconate in the total composition is on the order of about 5 to about 7 phr. In the case of organotin compound, the most useful parts are on the order of about 2 to about 3 phr. Each of the components of the system can range from 1 to 10 phr. The ratios of the components is not considered to be critically limiting among the broader aspects of the invention.

(4) Plasticizer

As stated above, it has been found that the unplasticized PVC compositions are compostable with the prodegradant system of this invention. However, in a broader mode, the vinyl halide composition can be plasticized with aliphatic or aromatic esters, typically, di-octyl adipate (DOA), di-isononylester of cyclohexane dicarboxylic acid or di-isodecyl phthalate (DIDP). In its presently best mode, the aliphatic ester is used. It was previously believed that the mobility in the polymeric matrix lent by the plasticizer was important because rigid PVC samples had not previously demonstrated compostability. However, it has now been found that the unplasticized PVC samples are compostable according to this invention.

The principles of this invention and its operating parameters will be further understood with reference to the following detailed examples which serve to illustrate the types of specific prodegradants and their amounts as used in typical vinyl halide polymer resin formulations and the compostabilities displayed by the essential combination of the prodegradant system components of this invention. These examples are considered to be exemplary of this invention and should not be considered as limiting, especially in view of applicant's broad disclosure of the principles of this invention.

In each of the examples 1-11, as follows, standard resin formula was employed which contained 100 parts by weight polyvinyl chloride homopolymer (Geon 121 PVC by B.F. Goodrich). Included in the standard formula was a plasticizer such as di-octyl adipate (DOA) or di-isodecyl phthalate (DIDP).

The compostability of the PVC compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), 30% distilled water, and 10% fermenting inoculum from an active composter. 50 g were used in sealed Petri dishes with 2 by 1 inch samples of PVC composition or composite sheet material. All experiments were run at 97° F. in a dark incubator.

Example 1

A plastisol was mixed with consisting of 100 parts PVC (Geon 121), 80 parts di-isodecyl phthalate (DIDP), and 2 parts dibutyltin dilaurate (DBTDL) heat stabilizer; coated as a 2 mil film on release paper and fused. Samples were unchanged after 90 days exposure to the test conditions of ASTM D 5526-94. The procedure was repeated using di-octyl adipate (DOA) in place of DIDP. After 90 days, there was visible mold growth on the film but no visible evidence of decomposition. The procedure was repeated with the addition of 2.5 parts of a 4% solution of isothiazolone biocide (MICRO-CHEK 11, Ferro Corporation). In this case, there was no evidence of mold growth after 90 days.

Example 2

The plastisol of Example 1 was mixed using DOA, DBTDL plus 5 parts of titanium neoalkanato, tri(dioctyl) pyrophosphato-O-(adduct)-N— substituted methacrylamide (Kenrich LICA 38J). Fused samples were consumed in the test landfill within 10 days, vanishing to the visible eye. The experiment was repeated adding 2.5 parts of MICRO-CHEK 11 biocide, with identical results.

Example 3

The plastisol of Example 1 was mixed with DBTDL, LICA 38J and, replacing DOA with the di-isononyl ester of cyclohexane dicarboxylic acid (DINCH, BASF). Upon testing per ASTM D 5526-94 method, fused samples disappeared in 7 days, with or without added biocide.

Example 4

Example 3 was repeated with the zirconate analog of LICA 38J (Kenrich NZ 38J). Upon testing per ASTM D 5526-94 method, fused samples disappeared within 10 days.

Example 5

The plastisol was mixed using DINCH, LICA 38J and dibutyltin maleate ester heat stabilizer (PLASTISTAB 2808, Halstab) in place of DBTDL. Upon testing per ASTM D 5526-94 method, fused samples disappeared within 10 days.

Example 6

The plastisol was mixed using DINCH, LICA 38J, and 2 parts of a liquid calcium/zinc stabilizer (PLASTISTAB 3002, Halstab) in place of DBTDL organotin. After 90 days, the fused sample had heavy mold growth and had fragmented but was still visibly of the same dimensions.

Example 7

Control samples were run for comparison. Upon testing per ASTM D 5526-94 method, samples of untreated filter paper showed mold growth within week and were consumed in 30 days. A sample of polylacetic acid (PLA) 2 mil film was completely consumed in seven days. A sample of 1 mil low density polyethylene (LDPE) film was unchanged after 90 days.

Example 8

A plastisol was mixed consisting of 100 parts Geon 121 PVC, 80 parts DOA, 2 parts DBTDL stabilizer and 5 parts of LICA 38, which is the titanate LICA 38J without the methacrylamide adduct. After 30 days at 971F per ASTM D 5526, there was no visible sign of decomposition. The same result was found with NZ 38, the zirconate bases for NZ 38J, and with 5 parts of methacrylamide itself. These tests establish that the methacrylamide adduct of the organotitanate or zirconate is necessary for compostability.

Example 9

A plastisol was mixed consisting of 100 parts PVC, 80 parts DOA, 5 parts LICA 38J organotitanate-methacrylamide adduct, and 2 parts of dibutyltin di-isothioglycolate (SP1002, Ferro Corporation). After 30 days, there was only minor decomposition. This probably reflects the antioxidant capability of organotin mercaptides. It also presently establishes the preferred organotin carboxylates in the prodegradant system.

Example 10

Example 9 was repeated using the following stabilization system: epoxidized soybean oil (ESO)—2 parts; phenyl di-iso-decyl phosphite —2 parts; zinc stearate—0.2 parts. After 30 days, there was no visible compostability, probably due to the antioxidant capability of the phosphite that would be used in most mixed metal stabilizer systems. In this case there was, however, notable mold growth, so it is possible that there might be eventual decomposition (period of years). Repetition using ESO containing 4% isothiazolone biocide led to no mold growth.

Example 11

As described previously, plastisol was mixed consisting of 100 parts Geon 121 PVC, 80 parts DOA, 2 parts DBTDL, and 5 parts of Kenrich LICA 38J reactive titanate. To this was added 5 parts of VULCABOND MDX (Akzo Nobel) bonding agent. The plastisol was coated on polyester fabric and fused to a coating of about 5 mils thickness.

A sample of this coated fabric with the inventive prodegradant system and a control sample of a commercial finished product of the same construction (without the prodegradant system) were exposed at 90° F. per ASTM D5526 conditions. After two weeks exposure, the control sample was essentially unchanged. The inventive sample has lost almost all trace of plastisol to the landfill, the only remnants being that which penetrated intersections of the fabric mesh. The fabric shows evidence of some decomposition and it is anticipated that the polyester will slowly decompose.

Example 12

In Examples 1-11, the PVC samples were plasticized with DOA or DIDP in combination with a prodegradant system which was the adduct of K-38 and dimethylaminopropyl methacrylamide (DMPDMA). In order to demonstrate the effectiveness of the monomeric adduct in comparison to each of the adduct components, Examples similar to 1-11 were repeated with each of the adduct components alone. None of the components of the adduct, alone, caused depolymerization of the halogenated polymers. However, if each of the components of the adduct were added separately to the PVC compound, and reacted in situ, the combination was as effective as adding the adduct. Accordingly, it has been presently demonstrated that the monomeric adduct of the organotitanate or zirconate is essential in order to obtain the desired results of the prodegradant system.

As stated above, the theory or mechanism of the advantageous results of the prodegradant system of this invention is not completely understood. However, a possible explanation for the depolymerization of PVC in the landfill is that it seems likely that PVC loses HCl to amines formed in the landfill as their salts. Further, decomposition of PVC at a 2% level into an ASTMD 5526 landfill does not seem to have negative effects on the ability of the landfill to support plant growth. This benign effect is required by ASTMD 6400 Standard Specification for Compostable Plastics. The DMPDMA moiety possibly reacts with conjugated unsaturation that has developed in PVC by a Diels Alder condensation (which is a reversible route leading to the possibility of the additive being catalytic and not being consumed). DMPDMA is an extremely reactive monomer. A consequence is that C—C bonds in the polymer chain are brought into close proximity to a coordination-activated (titanium or zirconium), apparently leading to C—C bond breaking. At 45-60 days, when the prodegradant additive is used or formed in situ, PVC is not readily visible to the unaided eye. Microscopically, one can discern 5-50 micron light flakes that appear to be PVC compound, as well as roughly cubic 2-5 micron calcium carbonate crystals.

Example 13

Examples 1-12 were based upon plasticized halogenated polymer compositions. For the purpose of demonstrating unplasticized halogenated polymer compositions, further examples were performed. The compositions were based on Dow Chemical VYHH, a PVC copolymer containing 14% vinyl acetate, intrinsic viscosity of 0.5 and readily soluble in MEK (insoluble in hexane). The VYHH PVC copolymer does not itself decompose into the landfill, nor does this occur with 2-5 phr of K-38 which is the titanate component of the adduct. However, when samples containing 5, 1, and 0.5 phr K38J adduct, and 2 phr DBTDL stabilizer, depolymerization, or compostability, was observed upon performing the ASTMD 5526 conditions. Accordingly, when using the prodegradant system of K38J, after 60 days at 35° C. in the dark, no visual traces of the PVC compound were observed.

Accordingly, these examples demonstrate that unplasticized halogenated polymers will effectively decompose with the prodegradant system of this invention.

Example 14

The procedures of Example 13 were repeated with chlorinated polyethylene (CPE) powder, Dow Tyrin 3615. After 60 days, the CPE compound was in the form of traces of 0.1-1.0 mm grayish powder which were insoluble in hexane.

Having described this invention in its various embodiments and parameters, other variations will become apparent to a person of ordinary skill in the art without deviating from the scope of the described embodiments and the invention.

What is claimed is:

1. A compostable vinyl halide polymer composition comprising
a vinyl halide polymer, and
a prodegradant system comprising (a) a monomeric adduct of an organotitanate or organozirconate and (b) an organotin compound, said prodegradant system in relative amounts to render the vinyl halide polymer composition compostable, wherein said adduct is defined by the formula:

organotitanate or zirconate —P=O(OH) salt-forming group —R—C=C-activating group, where R is a hydrocarbon radical or substituted hydrocarbon radical and the activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide.

2. The composition of claim 1 wherein the activating group having a C=O is an ester, ketone, aldehyde, or amide.

3. The composition of claim 1 wherein each of the components of the prodegradant system is contained in an amount of from about 1 to about 10 phr of polymer.

4. The composition of claim 1 wherein the organotin is an organotin carboxylate.

5. The composition of claim 1 wherein said adduct is an organopyrophosphato adduct of a monomer selected from the group consisting of methacrylamide, N-substituted methacrylamide, methacrylate and N-substituted methacrylate.

6. The composition of claim 1 wherein said organotitanate or organozirconate is an amide or ester adduct of neoalkoxy modified monoalkoxy titantate or zirconate.

7. The composition of claim 1 wherein the monomeric adduct is selected from the group consisting of titanium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenoamide, zirconium IV neoalkanolato tri(dioctyl)pyrophosphate-O (adduct) N-substituted methacrylamide and zirconium IV bis(dioctyl)pyrophosphato-O (adduct) N,N-dimethylamino-alkyl propenoamide.

8. The composition of claim 1 wherein the vinyl halide polymer is polyvinyl chloride or copolymers thereof.

9. A compostable vinyl halide polymer composition comprising
a vinyl halide polymer, and
a prodegradant system comprising (a) a monomeric adduct of an organotitanate or organozirconate and (b) an organotin compound, said prodegradant system in relative amounts to render the vinyl halide polymer composition compostable,
wherein the monomeric adduct is an adduct of a monomer selected from the group consisting of
ethyl dimethylaminoethylmethacrylate,
methyl dimethylaminopropyl acrylate,
2-morpholine-N-ethyl acrylamide,
2-piperidinyl-N-ethyl acrylonitrile,
2-dimethylaminoethyl acrolein,
dimethylaminoethyl vinyl ether,
dimethylaminoethyl vinyl thioether,
4-dimethylaminomethyl styrene,
allyl 3-dimethylamino propionate,
methallyl 3-dimethylamino propionate,
thioallyl 3-dimethylamino propionate,
dimethylaminomethyl acrylate, and
dimethylaminomethylacrylamide.

10. A compostable vinyl halide polymer article comprising
an article containing a vinyl halide polymer, and
a prodegradant system comprising (a) a monomeric adduct of an organotitanate or organozirconate and (b) an organotin compound, said prodegradant system in relative amounts to render the vinyl halide polymer sheet compostable, wherein said adduct is defined by the formula:

organotitanate or zirconate —P=O(OH) salt-forming group-R—C=C-activating group where R is a hydrocarbon radical or substituted hydrocarbon radical and the activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide.

11. The compostable article of claim 10 wherein the monomeric adduct is selected from the group consisting of titanium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenoamide, zirconium IV neoalkanolato tri(dioctyl)pyrophosphate-O (adduct) N-substituted methacrylamide, and zirconium bis(dioctyl)pyrophosphato-O (adduct) N,N-dimethylamino-alkyl propenoamide.

12. The compostable article of claim 10 wherein the vinyl halide polymer is polyvinyl chloride or copolymers thereof.

13. A composite comprising the article of claim 10 and a compostable woven or nonwoven fabric.

14. The composition of claim 10 wherein the monomeric adduct is an adduct of a monomer selected from the group consisting of
ethyl dimethylaminoethylmethacrylate,
methyl dimethylaminopropyl acrylate,
2-morpholine-N-ethyl acrylamide,
2-piperidinyl-N-ethyl acrylonitrile,
2-dimethylaminoethyl acrolein,
dimethylaminoethyl vinyl ether,
dimethylaminoethyl vinyl thioether,
4-dimethylaminomethyl styrene,
allyl 3-dimethylamino propionate,
methallyl 3-dimethylamino propionate,
thioallyl 3-dimethylamino propionate,
dimethylaminomethyl acrylate, and
dimethylaminomethylacrylamide.

15. A compostable polyvinyl chloride (PVC) article comprising
a composite article comprising a sheet containing a polyvinyl chloride or copolymer thereof, and
a compostable woven or nonwoven fabric, and a prodegradant system comprising an organotin carboxylate and a monomeric adduct selected from the group consisting of titanium IV neoalkanolato tri(dioctyl)pyrophosphato-O (adduct) N-substituted methacrylamide, zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenoamide, and zirconium IV bis(dioctyl)pyrophosphato-O (adduct) N,N-dimethylamino-alkyl propenoamide, said prodegradant system in relative amounts to render the polyvinyl chloride or copolymer compostable.

16. The composite article of claim 15 wherein said woven or nonwoven fabric is a compostable fabric of a polymer selected from the group consisting of polyvinyl alcohol, polyacrylamide, polyacrylate, polymethacrylate and polyester.

17. A method of anaerobic biodegradation of a vinyl halide polymer article in a landfill comprising
    introducing a vinyl halide polymer article or a physically reduced form thereof into a landfill for anaerobic degradation, said article having a composition of
    a vinyl halide polymer,
    a prodegradant system comprising (a) a monomeric adduct of an organotitanate or organozirconate and (b) an organotin compound, said prodegradant system in relative amounts to render the vinyl halide polymer article compostable, wherein said adduct is defined by the formula:

organotitanate or zirconate —P=O(OH) salt-forming group-R—C=C-activating group, where R is a hydrocarbon radical or substituted hydrocarbon radical and the activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide, and
    anaerobically biodegrading said article in the landfill.

18. The method of claim 17 wherein said adduct is an organopyrophosphato adduct of a monomer selected from the group consisting of methacrylamide, N-substituted methacrylamide, methacrylate and N-substituted methacrylate.

19. The method of claim 17 wherein said polyvinyl chloride (PVC) polymer article comprises
    polyvinyl chloride or copolymer thereof, and
    a prodegradant system comprising an organotin carboxylate selected from the group consisting of dibutyltin laurate and dibutyltin maleate and a monomeric adduct selected from the group consisting of titanium IV neoalkanolato tri(dioctyl)pyrophosphato-O (adduct) N-substituted methacrylamide, zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenoamide, and zirconium IV bis(dioctyl)pyrophosphato-O (adduct) N,N-dimethylamino-alkyl propenoamide said prodegradant system in relative amounts to render the vinyl halide polymer composition compostable.

20. A method of anaerobic biodegradation of a vinyl halide polymer article in a landfill comprising
    introducing a vinyl halide polymer article or a physically reduced form thereof into a landfill for anaerobic degradation, said article having a composition of
    a vinyl halide polymer,
    a prodegradant system comprising (a) a monomeric adduct of an organotitanate or organozirconate and (b) an organotin compound, said prodegradant system in relative amounts to render the vinyl halide polymer article compostable, wherein the monomeric adduct is an adduct of
    a monomer selected from the group consisting of
    ethyl dimethylaminoethylmethacrylate,
    methyl dimethylaminopropyl acrylate,
    2-morpholine-N-ethyl acrylamide,
    2-piperidinyl-N-ethyl acrylonitrile,
    2-dimethylaminoethyl acrolein,
    dimethylaminoethyl vinyl ether,
    dimethylaminoethyl vinyl thioether,
    4-dimethylaminomethyl styrene,
    allyl 3-dimethylamino propionate,
    methallyl 3-dimethylamino propionate,
    thioallyl 3-dimethylamino propionate,
    dimethylaminomethyl acrylate, and
    dimethylaminomethylacrylamide.

21. The composition of claim 1 wherein the activating group has an oxygen of a vinyl ether conjugated with the C=C.

22. The composition of claim 1 wherein the activating group has an allylic linkage oxygen, nitrogen, or sulfur conjugated with the C=C.

23. The composition of claim 1 wherein the activating group has an aromatic ring of styrene or vinyl ferrocene conjugated with the C=C.

24. The compostable article of claim 10 wherein said organotin compound is selected from the group consisting of dibutyltin dialurate and dibutyltin malleate.

* * * * *